Dec. 16, 1969    C. A. SKALSKI ET AL    3,484,169
MOTION SENSING APPARATUS
Original Filed Jan. 21, 1964    5 Sheets-Sheet 1

CLEMENT A. SKALSKI
JOHN C. STILES
*INVENTORS*

BY
ATTORNEYS

CLEMENT A. SKALSKI
JOHN C. STILES
*INVENTORS*

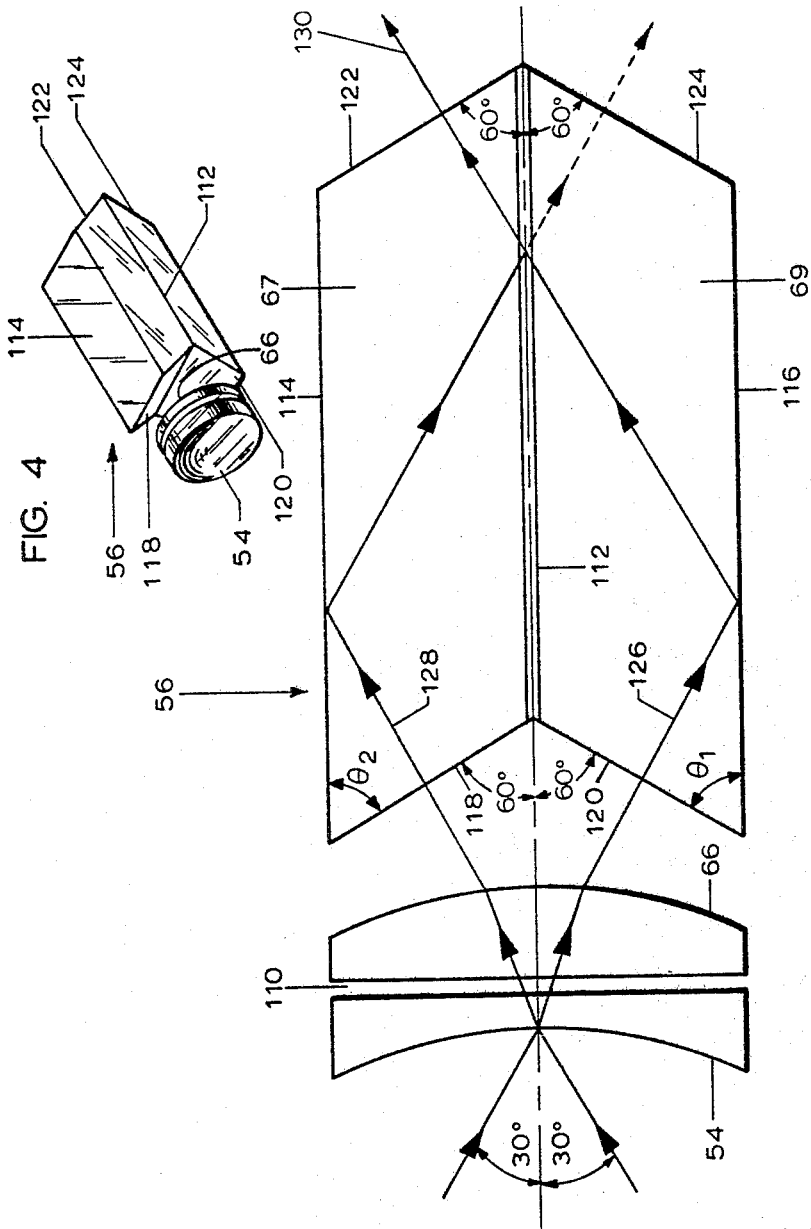

Dec. 16, 1969  C. A. SKALSKI ET AL  3,484,169
MOTION SENSING APPARATUS

Original Filed Jan. 21, 1964  5 Sheets-Sheet 4

CLEMENT A. SKALSKI
JOHN C. STILES
*INVENTORS*

BY *A. A. Giarratana*
*George B. Oujevolk*
ATTORNEYS

United States Patent Office 3,484,169
Patented Dec. 16, 1969

3,484,169
MOTION SENSING APPARATUS
Clement A. Skalski, Cambridge, Mass., and John C. Stiles, Mountain Lakes, N.J., assignors to Singer-General Precision, Inc., Little Falls, N.J., a corporation of Delaware
Original application Jan. 21, 1964, Ser. No. 339,132. Divided and this application Jan. 4, 1968, Ser. No. 710,695
Int. Cl. G01b 9/02
U.S. Cl. 356—106                     4 Claims

ABSTRACT OF THE DISCLOSURE

In one preferred embodiment of the invention, three gas-filled laser tubes are arranged as respective legs in an equilateral triangle. Separate prisms each of which has a spherical reflecting surface are used to commonly join each pair of adjacent tube ends respectively so that when the lasers are stimulated to emission by an RF energy source, the tubes and prisms form a closed optical loop for circulating counter-rotating beams of coherent light. One of the prisms is less than totally reflecting and passes about .6 percent of the impinging light to an optical combining circuit which, in turn, coacts with a photo-detector circuit. When the entire system is rotated, the circulating beams in the optical loop undergo a frequency split which is sensed at the photo-detector by suitable heterodyning techniques. The resulting beat signal is directly related to the rate of rotation of the system. In another preferred form of the invention, a gas-filled spherical laser cavity is provided having nine regions of reflectivity on the inside surface thereof. The regions are divided into sets of three each for obtaining frequency splits of corresponding rotating beams in respective ones of orthogonally related planes passing through the center of the spherical cavity.

---

This is a division of application Ser. No. 339,132, filed Jan. 21, 1964.

The present invention relates to apparatus using electromagnetic waves for measuring rotary motion, and more particularly to a precision optical gyro employing counter-rotating light beams for measuring small angular velocities and small angular displacements.

It has long been known that rotary motion with respect to inertial space can be measured by apparatus employing electromagnetic waves. A classical example of such an apparatus is the Sagnac interferometer which consists of a system of totally reflecting mirrors, a beam splitter (i.e., a partially silvered mirror), a light source and a screen or photographic plate. A beam of light from the light source is split into a clockwise beam and a counterclockwise beam by the beam splitter. After travelling through the mirror system, the two beams are combined by the beam splitter and made to impinge on the screen. If a slight misalignment is introduced into the optical system so that the combined light beams directed toward the screen are not parallel, an interference pattern will appear on the screen. Sagnac found that a shift in position of the interference fringes occurs when the apparatus is rotating, and that the amount of shift is directly proportional to both the angular velocity of the instrument and the area enclosed by the optical path of the clockwise and counterclockwise beams, and inversely proportional to the wavelength of the electromagnetic radiation used.

While a rigorous description of the Sagnac interferometer requires general relativity, a correct, though not precise, description of the physical phenomena is possible using classical theory.

The time required for the clockwise and counterclockwise beams to make a round trip through the system of mirrors is equal when the apparatus is stationary. When the apparatus is undergoing a clockwise rotation, the clockwise beam of light requires more time to make the round trip back to the beam splitter than the clockwise beam of light. Consequently, the clockwise travelling beam is seen to undergo a positive phase delay $\Delta \varphi$ and the counterclockwise beam undergoes a phase advance $\Delta \varphi$. The value of $\Delta \varphi$ is given by the following expression:

$$\Delta \phi = \frac{4\pi wA \cos \theta}{\lambda c} \qquad (1)$$

where $w$=the angular velocity of the system; $A$=the area of the optical path; $\lambda$=the wavelength of the light beams; $c$=the velocity of light; and $\theta$=the angle between the area $A$ and the plane normal to the axis of rotation.

The sensitivity of a Sagnac interferometer may be increased by increasing the area $A$ enclosed by the optical path and by decreasing the wavelength of the electromagnetic radiation used. The area $A$ of the instrument is limited by the maximum size which the instrument can have and the wavelength of the radiation to be used is usually determined by such factors as the availability of radiation sources and suitable mirrors and beam-splitters. In general, radiation at the optical frequencies is most conveniently used.

It has also been discovered that the clockwise and counterclockwise beams in a classical Sagnac interferometer can be made to travel around the same optical system a large number of times, which is referred to as multiwave regeneration. By using this regeneration technique, a resolution improvement of the order of 100 times is possible. With multiple wave regeneration, the optical circuit in effect becomes a high Q optical resonator. A small secondary optical circuit may be used to excite the main optical circuit and to extract samples of the counter-rotating beams in the resonator. The multiple wave regeneration technique not only increases the fringe displacement but also produces more clearly defined and brighter fringes as compared to a conventional Sagnac interferometer. However, the technique requires a light source having good purity and very good coherence; if small angular velocities are to be detected, good coherence over a distance of at least $10^8$ wavelengths is necessary.

The present invention contemplates a compact apparatus for the detection of extremely small displacements and angular velocities, comprising an optical resonator of the type referred to hereinabove, a gas laser amplifier unit, and a photodetector. In accordance with one preferred embodiment of the invention, a triangular optical path is provided by three spherical mirrors each having the same radius of curvature and equally spaced about the equator of the sphere defined by the mirrors so that the triangular optical path is an equilateral triangle. A helium-neon gas laser tube is positioned colinearly on one of the legs of the triangle and stimulated to emission by a radio frequency source to produce counter-rotating light beams having a wavelength of 6328 A. (red light). Two of the spherical mirrors are totally reflecting and the third has a reflectivity of about 99.4% and a transmittivity of 0.6%. The light coming through the third mirror is made to enter an optical combining circuit which brings the clockwise and counterclockwise beams into coin-cidence and parallelism within 10 arc-seconds of each other. These beams are made to impinge upon the cathode of a phototube which produces a DC output signal when the system is not rotated. However, when the system is rotated, the respective beams exhibit phase shifts of opposite sense, due to the invariant speed of light. Specifically, there is an apparent lengthening of the optical path for the beam travelling in the same direction as the rotation and a corresponding effective shortening of the path for the opposite travelling beam. Consequently a frequency difference is produced between the two beams the magnitude of which is proportional to the speed of rotation. The combination of the two frequencies yields a beat signal at the output of the phototube which is directly related to the velority at which the system is rotated. The beat frequency is measured with great precision, such as by electronic superheterodyne techniques. The minimum measurable beat frequency is determined by the frequency band width of the laser oscillations, but since the helium-neon laser unit employed has a very narrow frequency bandwidth (i.e., in the order of a few cycles), small beat frequencies may be measured which, in turn, means that very small angular velocities, or angular displacements as will be described, may be detected by the optical gyro.

Accordingly, it is one object of the invention to provide an optical gyro having unparalleled performance in terms of its sensitivity, freedom from drift, reliability and absence of moving parts.

It is another object of the invention to provide an optical gyro having extreme sensitivity and which is also relatively low in cost.

It is a further object of the invention to provide a family of optical gyros having unprecedented accuracy.

It is a still further object of the invention to provide an optical gyro employing a gaseous laser unit having a very narrow frequency bandwidth and short wavelength.

It is a still further object of the invention to provide an optical combining circuit capable of combining two angularly oriented beams of light into coincident beams parallel to within about ten seconds of arc or better.

It is a still further object of the invention to provide an optical gyro having its optical path formed by spherical mirrors to mitigate aberration problems.

It is a still further object of the invention to provide an optical gyro having an equilateral triangular optical path formed by three equally spaced spherical mirrors wherein one of the mirrors has a special lens on its back surface which cooperates with the combining circuit described above to transmit an optical signal to a photodetector in a more effective manner.

It is a still further object of the invention to provide an optical gyro of the type described above having an equilateral triangular resonator formed by spherical mirrors in a manner to simplify alignment problems, provide a high Q and minimize aberrations.

It is a still further object of the invention to provide an optical gyro which may be used as an accurate angular position reference with respect to inertial space.

It is a still further object of the invention to provide an optical gyro in which the entire optical resonator is embodied in a hollow sphere having nine reflecting regions arranged in sets of three for defining three triangular optical paths disposed in respective orthogonally related planes, for sensing rotation about axes perpendicular to such planes.

It is a still further object of the invention to provide an optical gyro employing a pair of photo-detectors for sensing the direction of rotation of the optical path as well as the velocity of rotation.

It is a still further object of the invention to provide an optical gyro employing a solid laser unit producing counter-rotating beams contained within the solid laser unit.

Other objects and features of novelty of the present invention will be specifically pointed out or will otherwise become apparent when referring, for a better understanding of the invention, to the following description taken in conjunction with the accompanying drawings, wherein:

FIG. 3 is a side view of the combining circuit illustrated in FIG. 2 with a modification in the mirror lens construction thereof;

FIG. 4 is a perspective view of the combining circuit illustrated in FIG. 3;

Figure 1:
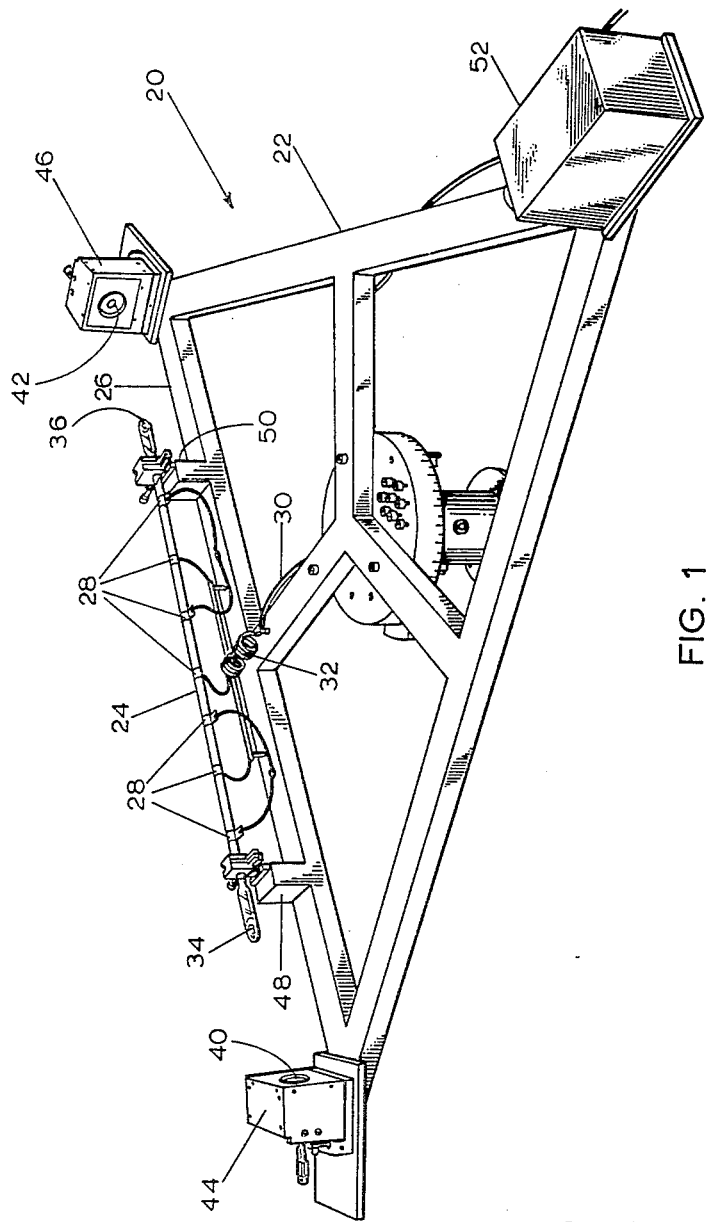
FIG. 1 is a perspective view of an optical gyro illustrating one embodiment of the present invention.

Referring to FIG. 1, an optical gyro 20 is shown which illustrates one embodiment of the present invention. It comprises an equilateral triangular frame 22 made of a suitable light, non-magnetic material such as aluminum, for example. A gas laser tube 24 is mounted on a leg 26 of the frame and briefly comprises an elongated gas tube made of a suitable material such as quartz and filled with a gaseous laser material such as helium-neon gas. The gas is stimulated to emission by a plurality of electrodes 28 encircling the tube and spaced axially therealong. The odd numbered electrodes are grounded and the even numbered electrodes are connected to a coaxial transmission line 30 with a series loading coil 32 interposed therebetween to match the impedance of the electrodes to the transmission line. The transmission line in turn is connected to a transmitter (not shown) which provides the radio frequency energy. The series loading coil 32 makes it easier to start the tube lasing and also eliminates overheating in the transmission line 30.

The gaseous laser unit is preferred since it is easily pumped with only 50 watts of power at approximately 30 mc. In addition, the power output (1 to 10 mw.) is adequate for most applications and contains no spikes; no liquid nitrogen cooling is required and the gaseous laser unit facilitates the design of a relatively lightweight and compact system. Antiparallel Brewster's angle windows 34 and 36 are provided at the ends of the laser tube 24. The angle windows provide an impedance match from the quartz to air and also polarize the light beams emitted from the ends of the tube. Any dust particles or surface irregularities will scatter only a very small portion of the clockwise beam in the counterclockwise direction and vice versa. This scattered light is depolarized and the Brewster's angle windows 34 and 36 in the optical path help prevent the scattered light from travelling around the optical path.

Totally reflecting spherical mirrors 40 and 42 are supported in alignment with the laser tube 24 by two-degree-of-freedom mirror mounts 44 and 46, respectively, which in turn are adjustably mounted at two apexes of the triangular frame 22. At this point, it is also noted that the laser tube 24 is supported at its ends by a pair of microscope stages 48 and 50 to simplify the alignment of the tube with the mirrors 40 and 42. A third spherical mirror 54 (visible in FIG. 2) is supported by a two-degree-of-freedom mount positioned within a housing 52 mounted on the remaining apex of frame 22. Housing 52 also contains an optical combining circuit 56 and a phototube 58 which can be seen in the schematic view of FIG. 2.

In the illustrated embodiment, the radius of curvature, $r$, of each of the mirrors 40, 42, and 54, is equal to the radius R of a circle 50 circumscribing the triangular optical path of the laser beam. Thus, the spherical mirrors have a common center at 62 coinciding with the center of the sphere defined by the mirrors and having circle 60 as its equator. It will be understood, however, that the relationship between the curvature of the mirror and their distance from point 62 need not be such that $r=R$. On the contrary, positioning the mirrors inwardly of the point where $r=R$ increases the amount of misalignment which can be tolerated. For example, in one operative embodiment of the invention, an alignment accuracy of about 5 arc-seconds was required with the mirrors disposed so that $r=R$ whereas an alignment accuracy of 5 arc-minutes could be tolerated with $R<r$. Generally speaking, in the relationship $r=kR$, $k$ should be within the range 0.7 to 1.0.

The operation of the gyro 20 of FIG. 1 will now be explained with reference to FIG. 2. Laser tube 24, when stimulated by its electrodes, transmits and amplifies respective polarized light beams through each of the Brewster's angle windows 34 and 36 which travel in opposite directions around the triangular optical circuit. The light beams have wavelengths of 6328 A. (red light); mirrors 40 and 42 are totally reflecting at this wavelength while spherical mirror 54 has a reflectivity of about 99.4%, transmitting about 0.6% of the light therethrough to the combining circuit 56. The remainder of the light is reflected to establish multiple-wave clockwise and counterclockwise light beams. Laser tube 24 presents a nearly perfect impedance match to the clockwise and counterclockwise travelling beams and amplifies the oppositely travelling beams independently.

The use of the three spherical mirrors to define an equilateral triangular optical path is an important feature of the invention. With this arrangement, the only optical paths which repeat are themselves equilateral triangles since all other beams will walk off the mirrors after a few reflections. This family of closed optical paths in the form of equilateral triangles is particularly simple, has a fixed perimeter-to-area ratio, and is invariant under rotation. It will be seen that if even one flat mirror were substituted for one of the spherical mirrors, the resulting optical path would be much more complex. Except for the equilateral triangle connecting the mirror centers, no optical path would ever repeat itself, since every time a ray returns to the flat mirror, it would have a new position and direction. Although there would be rays which remain on the mirrors after a number of repeating circuits, they would wander about and never perfectly repeat their positions and angles. It is apparent that this would produce a far more complicated family of optical paths than the simple family of equilateral optical paths produced by the arrangement of FIG. 2.

A special convex spherical lens 66 having the same radius of curvature as the spherical mirrors is mounted on the back of the spherical mirror 54 to straighten the wave fronts of the portions of the counter-rotating beams which are transmitted through the mirror 54 and direct them into the combining circuit 56. The combining circuit briefly comprises a pair of prisms 67 and 69 cemented together with a partially reflecting layer 68 therebetween which functions as a beam splitter to combine the two beams of light into a pair of coincident highly parallel beams directed upon the cathode of the phototube 58 which is a sensitive photomultiplier tube. The combining circuit 56 will be described in greater detail hereinafter since it is not a standard optical component and represents another important feature of the present invention.

Figure 9:
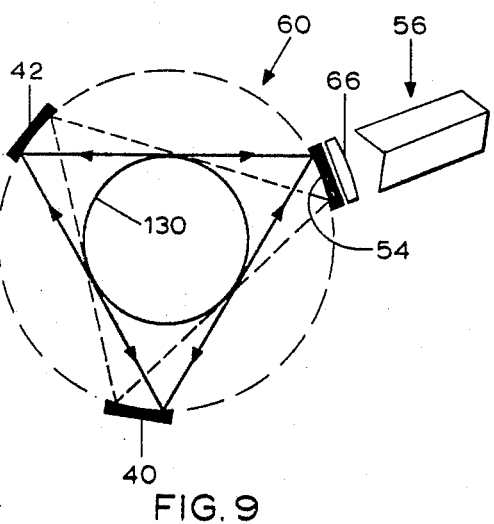
FIG. 9 is a schematic view illustrating with some exaggeration two of the family of equilateral triangular optical paths which may exist.

As mentioned above, the three equally spaced spherical mirrors 40, 42 and 54 produce a family of equilateral triangular paths all having the same perimeter to area ratio. Two of these ray paths are illustrated in FIG. 9 with some exaggeration, one in dotted lines and the other in solid lines. By employing the plano-convex lens 66 after the spherical mirror 54, as illustrated in FIG. 4, the optical path length through the mirror-lens combination for each of these ray paths is independent of the position of the apex of each path relative to the mirror 54. The focal length of the spherical surfaces of the mirrors 40, 42 and 54, whose dimensions are small compared to their radius of curvature, is equal to ½ the radius. A sphere 130 whose radius is ½ the radius of the sphere 60 defined by the mirrors themselves is shown in FIG. 9. It will be seen that this smaller sphere can be inscribed tangent to all equilateral triangular paths lying between the two extreme paths illustrated in FIG. 9 so that the sphere 130 describes the surface from which rays going to the combining circuit appear to emanate. Because of this, the combining circuit does not see the two bundles of rays coming from an apparent point source, but rather from an extended source which creates an aberration problem. The mirror-lens combination and the combining circuit 56 of the present invention significantly minimize this aberration problem.

Figure 2:
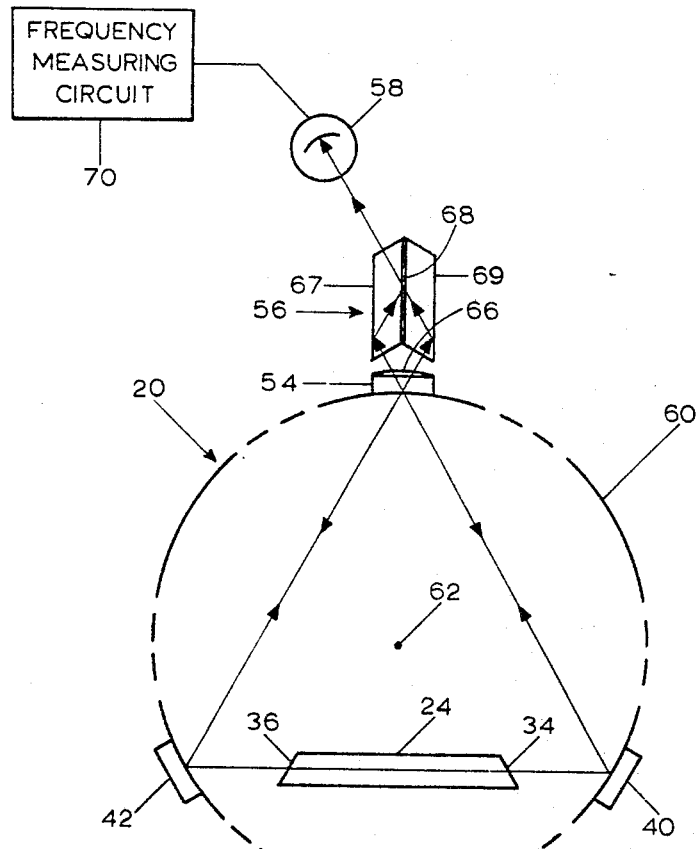
FIG. 2 is a schematic diagram of the optical gyro illustrated in FIG. 1.

The apparatus illustrated schematically in FIG. 2 is basically an oscillator. The optical laser is the active element and the large optical circuit provided by the reflecting mirrors is the associated tank circuit. Since the optical circuit is basically a sphere which, in the embodiment illustrated, has a radius of 80 cm., all possible triangular paths for the beams of light have equal length. Neglecting diffraction losses, which are relatively small, the Q of the tank circuit is given by the following formula:

$$Q=\frac{\pi\left(\frac{L}{\lambda}\right)}{1-g} \quad (2)$$

where $\lambda$=wavelength, L=the length of the triangular optical path and $g$=path gain. The path gain indicated by $g$ is simply the square root of the path power gain. A typical example of the path gain is $g=0.98$. The optical path length L for the optical gyro 20 illustrated in FIG. 2 is 415 cm. and the operating wavelength is 6328 A or $6.328 \times 10^{-5}$ cm. Introduction of these parameter values into equation (2) indicates that $Q=10^9$. Considering that a wavelength of 6328 A corresponds to a frequency of $4.7 \times 10^{14}$ cps., the passive bandwidth of the resonator, which is simply the operating frequency divided by the Q, is 0.47 megacycles. A narrow passive bandwidth is important because oscillator linewidth depends on the square of this quantity. The linewidth is always much smaller than the passive bandwidth.

When the system illustrated in FIG. 2 is stationary, the frequencies of the counter-rotating beams of light are equal and a DC signal plus noise is detected at the phototube 58. However, when the system is rotated in a clockwise direction about an axis passing through the center 62 perpendicular to the plane of the equilateral triangle, the clockwise travelling beam of light is seen to undergo a positive phase delay and the counterclockwise beam undergoes a phase advance in the same amount. These phase changes produce a frequency split which, in turn, causes a beat signal to be generated in phototube 58. The beat frequency is directly proportional to the speed of rotation of the system and can be applied to a frequency measuring circuit 70 as illustrated in FIG. 2 to produce an output indicating the speed of rotation of the system.

Referring to FIGS. 3 and 4, the combining circuit 56, and mirror-lens combination are shown in greater detail. The lens 66 is a plano-convex lens mounted behind the spherical mirror 54 by a suitable supporting means (not shown) with a small air gap 110 therebetween. The flat faces of the lens and spherical mirror are not precisely parallel with one another, but rather define a very small wedge angle of about 15 arc-minutes to eliminate the effect of reflections; alternatively, the lens and mirror can be cemented together. As mentioned previously, the radii of the spherical surfaces of the mirror 54 and lens 66 are the same and in the embodiment illustrated are 80 cm. The diameter of the mirror and lens is about one inch, the focal length of the lens is 1750 mm. and the lens is about ¼-inch thick. The combining circuit comprises two prisms 67 and 69 cemented together with a beam splitter coating 112 provided therebetween. The top and bottom surfaces 114 and 116 of the prisms are parallel with one another and the end faces 118–124 are each at an angle of 60° with the beam splitter coating 112 and the top and bottom surfaces 114–116. The tolerance on these 60° angles is plus or minus 2 arc-seconds. The path of the clockwise beam through the combining circuit 56 is indicated by the numeral 126 and the path of the counterclockwise beam is indicated by the numeral 128. Portions of the beams are combined into a beam 130 which is directed to the phototube 58. The component rays of the combined beam 130 are parallel to within better than 10 arc-seconds in order to insure the production of a beat signal at the output of the phototube.

The elements of the combining circuit are made of high optical quality fused quartz and the holder or frame (not shown) for mounting the lens 66 on the mirror 54 and for holding the combining circuit 56 in the proper position relative to the lens may be made of a suitable material such as brass or aluminum. As stated previously, the radius of curvature of the spherical surfaces of the mirror 54 and lens 66 is the same, namely 80 cm., but because of the 15 minute wedge angle formed by their flat surfaces, the spherical surfaces are out of parallelism with each other by 15 minutes of arc. This is compensated for by cocking the combining circuit by about ½ the wedge angle, i.e., 7 or 8 minutes of arc.

The optical gyro of the present invention is more than a high precision angular velocity measuring device. It can also be used as an absolute inertial reference by taking advantage of the fact that the energy distribution (i.e., standing wave) produced in the optical gyro by the counter-rotating light beams remains stationary with respect to inertial space providing that locking to the apparatus does not occur.

Figure 10:
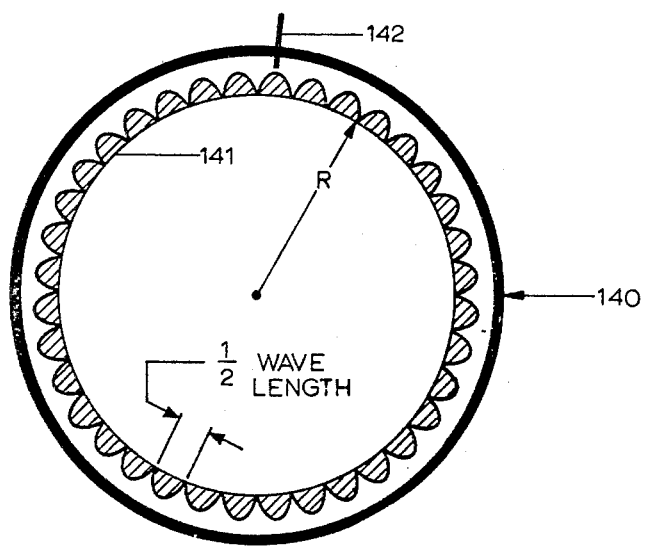
FIG. 10 is a schematic view of a spherical optical gyro used as an absolute inertial reference.

In FIG. 10, the energy distribution is shown as disposed along the periphery of a circle of radius R. A probe 142, fixed relative to the frame of the apparatus, represents any suitable energy detection means, such as the sampling and photo-detection arrangements already described. As the energy distribution pattern is fixed with respect to inertial space, rotation of the gyro frame moves probe 142 along the standing wave pattern at a rate dependent upon the angular velocity. Counting the rate at which the probe encounters maxima and/or minima yields a paramater representative of the angular velocity.

With the assumption of a circular energy distribution, as shown in FIG. 10, the functioning of the apparatus as both an absolute inertial reference and as an angular velocity meter is readily calculated.

The spacing between maxima of the energy distribution is $\lambda/2$ and the resolution of the device as an angular position indicator is better than the angle defined between the respective positions of a probe 142 (representing an energy detector) at adjacent points of maximum and minimum energy. This angle, $\theta$ min, is simply $\lambda/4$ divided by the radius, i.e., $$\theta \text{ min} = \lambda/4R \qquad (3)$$

For example, with light of $\lambda=6300$ A. and $R=5$ cm., an angle of 0.65 arc-second can be resolved.

The output frequency produced in an optical gyro-turning at a constant angular velocity $\omega$ can also be calculated with reference to FIG. 10. Consider that as probe 142 moves over one hump in the energy distribution, a full output cycle of signal voltage or current is produced. This is the case because energy is distributed according to $\cos^2 X = \frac{1}{2}(1 + \cos 2X)$. The velocity at the perimeter of the optical gyro is $\omega R$. Calling the time required to produce one output cycle T and knowing that a point on the perimeter moves $\lambda/2$ in this time, it is possible to write $$\frac{\lambda/2}{T} = \omega R \qquad (4)$$

Since the output frequency $\Delta f$ is simply $1/T$, from Equation 4 is obtained the result $$\Delta f = \frac{2\omega R}{\lambda} \qquad (5)$$

for a circularly shaped optical gyro having a radius R.

The general nature of Equation 5 can be demonstrated by noting that, for a circle of radius R, the ratio of area of perimeter $A/l$ is $\pi R^2/2\pi R = R/2$. Therefore Equation 5 can be written $$\Delta f = \frac{4\omega A}{\lambda l} \qquad (6)$$

where $l$ = length of optical path
$A$ = area enclosed by optical path.

Equation 6 can be derived rigorously by considering that the times required for the two counter-rotating beams of light to travel once around the optical circuit are different when the apparatus is undergoing rotation.

In an equilateral triangular optical path such as that in the FIGURE 1 apparatus, the ratio $$A/l = \frac{L}{4\sqrt{3}}$$

where L is the length of one leg of the triangle. For this special case then, the frequency split obtainable, found from Equation 6, is $$\Delta f = \frac{L\omega \cos \theta}{1.732\lambda} \qquad (7)$$

when $\theta$ (the angle between the plane of rotation and the plane of the optical path) $=0$, $\cos \theta = 1$ and Equation 7 reduces to $$\Delta f = \frac{L\omega}{1.732\lambda} \qquad (8)$$

In the optical gyro of FIGS. 1 and 2, $\lambda=6328$ angstroms, $L=138.56$ cm. and $\theta=0$ since it is assumed that the plane of rotation is the same as the plane defined by the equilateral triangular path. Introduction of these parameter values into Equation 3 indicates that a frequency split of $1.27 \times 10^6 \omega$ will be obtained. If $\omega$ equals 0.1 radians per second (approximately 1 r.p.m.) then $\Delta f$ equals 127 kc. It is apparent that this is a relatively large frequency split which can be easily measured by sensitive frequency measuring apparatus. Since the helium-neon gaseous laser unit is capable of linewidths significantly less than one c.p.s., it is apparent that the system of FIG. 2 will produce measurable frequency splits at angular velocities well below one degree per hour. It is likewise apparent that the radius of the sphere 60 can be significantly decreased to reduce the size and weight of the apparatus.

Figure 8:
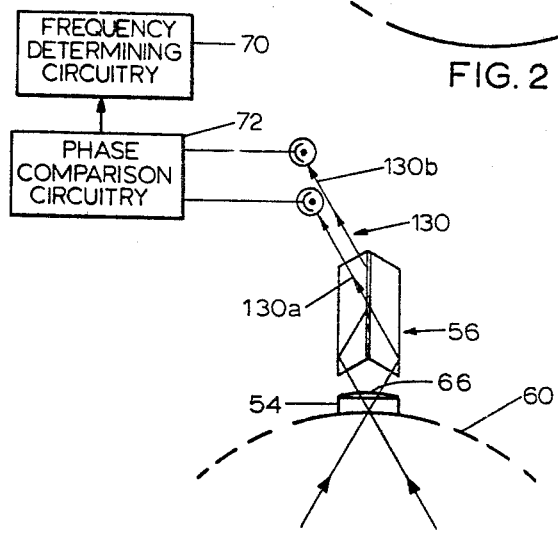
FIG. 8 is a fragmentary schematic view of a modified detection arrangement which may be used to sense the direction as well as the speed of rotation.

Referring now to FIG. 8, there is illustrated schematically an arrangement for detecting direction as well as speed of rotation of the system. This arrangement employs two photo-detectors 58, 58' positioned to receive the output beam 130 from optical combining circuit 56. Actually, beam 130 is composed of two substantially parallel rays 130a and 130b and will form an interference pattern if intercepted on a screen placed normal to their direction of propagation. Assuming plane waves, the spacing X between maxima in the interference pattern is equal to $\lambda/\theta$ where $\lambda$ is the wavelength and $\theta$ is the angle between the waves. For $\lambda=10^{-4}$ cm. and $\theta=10$ arc-sec., $X=0.18$ cm.

If a useful beat note is to be obtained from a photodetector, it is important that only a fraction of an interference fringe be incident upon its cathode. The reason for this will be apparent from the following description of the mechanism involved in the production of a beat note.

The beat note is produced by movement of the interference pattern across the photo-detector; the beat frequency is directly proportional to the velocity of the pattern relative to the photo-detector. Movement of the interference pattern is due to, and occurs only during, rotational displacement of the optical path. The velocity of pattern movement is directly proportional to the angular velocity of the optical path.

With a large number of interference pattern maxima (and minima) present on the photocathode, a photo-detector will produce a DC signal, plus a relatively small AC signal if the interference pattern is in motion. During movement of the pattern, the number of maxima intercepted cannot vary by more than one. Consequently, the fractional amplitude modulation of the DC signal produced by rotation of the optical path can be no greater than the reciprocal of the number of interference maxima intercepted on the photocathode.

Where, as shown in FIG. 8, two photo-detectors (58, 58') are used to enable sensing direction, it is essential that their photocathodes intercept only a small portion of an interference fringe. It is also essential that photocathodes 58, 58' be positioned so that while one is sensing a maximum, the other is sensing a point in the interference pattern which is halfway between a maximum and an adjacent minimum. When the detectors are thus positioned, the AC signal from one will always be in quadrature with the signal from the other and will lead or lag in direct dependence on the direction of rotation. By phase comparison of the output signals of photodetectors 58, 58', which can be accomplished by conventional phase detecting circuitry 72, the sense of rotation can be determined. The speed of rotation can be determined in the manner already described with conventional frequency measuring circuitry 70.

It will be understood that the direction-sensing arrangement shown in, and described with, reference to FIG. 8, is applicable to all embodiments of the invention.

Figure 5:
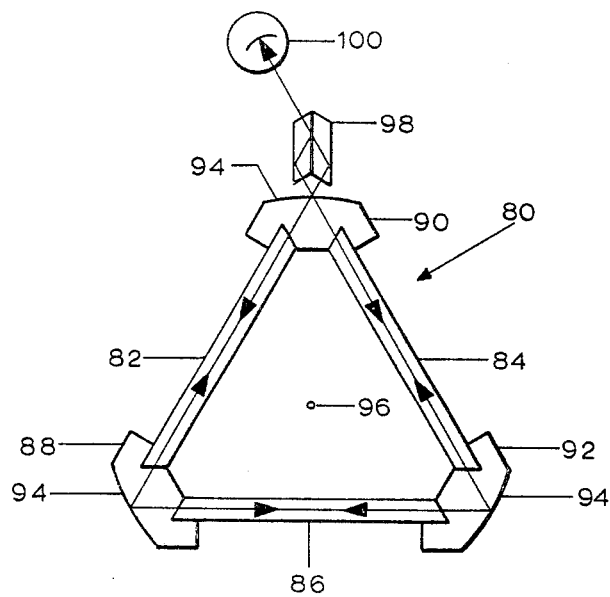
FIG. 5 is a schematic view of an optical gyro illustrating another embodiment of the invention.

Referring to FIG. 5, a more sophisticated optical gyro 80 is shown which is greatly reduced in size and which is basically a one-piece unit. It comprises three small gas laser tubes 82, 84 and 86 each having the Brewster's angle windows on the ends thereof. The ends of the tubes are fixed to quartz prism reflectors 88, 90 and 92 to form an equilateral triangle. Each of the prisms has a spherical prism reflecting surface 94 having a common center of curvature 96. The spherical surfaces of the quartz prisms 88 and 92 are totally reflecting and the spherical surface of the quartz prism 90 has a reflectivity of about 99.4% so as to enable samples of the counter-rotating light beams to be combined by a combining circuit 98 and applied to a photo-detector 100.

Each of the laser tubes 82, 84 and 86 is made of quartz and filled with a helium-neon gaseous laser material which is stimulated to emission by applying a radio frequency voltage to suitable electrodes (not shown) which may be clamped about the gas tubes. In this embodiment the photo-detector 100 is preferably a solid state photocell square law detector.

With this construction, the total triangular optical path length can be reduced to less than 10 inches and still provide unparalleled performance. The materials used in the optical gyro 80 are all relatively inexpensive and fabrication costs are small with the exception of the labor required to align the mirror system provided by the spherical surfaces 94. This alignment is done by carefully grinding and polishing one of the prism reflectors after the assembly has been made and filled with gas. Failure of the optical gyro is caused only by contamination of the gas system. With sophisticated techniques for out-gassing and sealing the quartz assembly and reducing the power required to excite the gas system, the life of the gyro can eventually be increased to about 50,000 hours or more.

Figure 7:
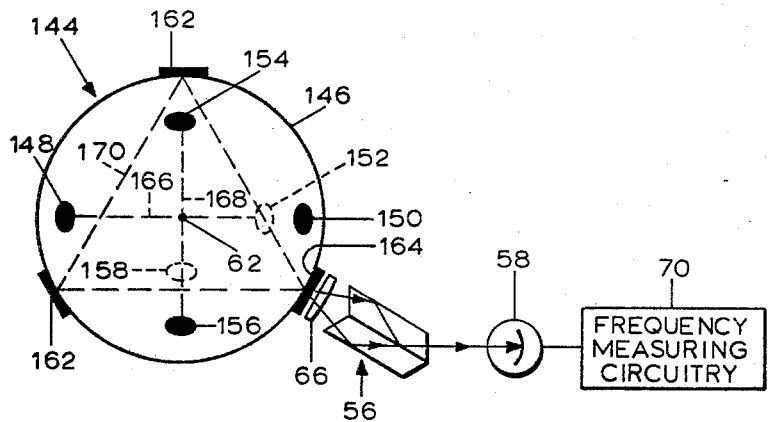
FIG. 7 is a schematic view of an optical gyro illustrating another embodiment of the invention.

Referring to FIG. 7, a spherical optical gyro 144 is illustrated schematically for sensing rotation about any of three orthogonally-related axes. The gyro 144 comprises a hollow sphere 146 filled with a suitable gas laser material such as helium-neon. Nine spherical mirrors or reflecting regions 148–164 are formed on the wall of the spherical cavity and arranged in sets of three to define three separate equilateral triangular optical paths 166, 168 and 170 for the counter-rotating light beams. Each of the three triangular optical paths defines three orthogonally related planes and the center of each triangular path lies on the center of the spherical cavity. The combining circuit 56 and plano-convex lens 66 may be associated with one of the spherical mirrors of each set along with the phototube 58 and frequency measuring circuitry 70 to measure the frequency split experienced by the counter-rotating beams of each triangular path. In FIG. 7, only one combining circuit 56 and plano-convex lens 66 is shown, in association with the spherical mirror 164.

Figure 6:
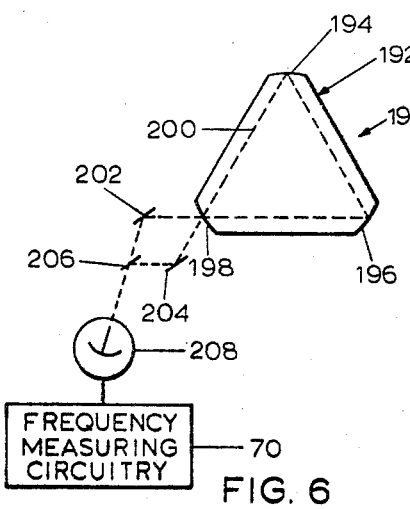
FIG. 6 is a plan view of a solid laser unit.

Referring to FIG. 6, an optical gyro 190 is illustrated employing a triangular, solid laser crystal 192 having three beveled corners 194, 196, 198 which provide plane or spherical reflecting surfaces. Surfaces 194 and 196 are totally reflecting and the surface 198 is suitably coated to provide 99.4% reflection and 0.6% transmission. When stimulated to emission in a conventional manner, some of the rays will form counter-rotating beams following the rectangular optical path 200. Samples of these counter-rotating beams will pass through the reflecting surface 198 to totally reflecting mirrors 202 and 204 and thence to a conventional beam splitter 206 which combines the beams and directs the combined beams onto the cathode of a suitable phototube 208. The beat frequency output of the phototube is again measured by the frequency measuring circuitry 70.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A motion sensing apparatus comprising a plurality of quartz crystals interconnected by gas-filled laser tubes to form an equilateral triangle, means for stimulating said laser tubes to emission for producing counter-rotating light beams passing outwardly from the ends thereof, each of said crystals having a spherical reflecting surface thereon said spherical surfaces having a common center of curvature and being in position to reflect the light beam from either tube connected thereto along the axis of the other tube connected thereto wherein two of said reflecting surfaces are totally reflecting and one transmits a portion of the light means therethrough, optical combining circuit means for combining the light beams from said one partially transmitting surface into one light beam, a photodetector energized by said one light beam and frequency measuring circuitry for measuring any beat frequency in the output of the photo-detector resulting from rotation of the optical gyro.

2. Apparatus according to claim 1 wherein each of said tubes is made of quartz and has enclosed angled ends forming Brewster's angle windows for polarizing light beams passing therethrough.

3. An optical gyro comprising a quartz body having a spherical cavity therein filled with a gas laser material, said body including means for stimulating said gas laser material to emission and for producing counter-rotating light beams within said spherical cavity, said cavity having at least three reflective regions on the inside surface thereof for continuously circulating said light beams in a circular plane path passing through the center of said cavity, and means for measuring the field strength of the standing wave produced by said counter-rotating light beams whereby said body is rotated with respect to an inertial reference frame said standing wave will remain stationary with respect to the inertial reference frame and said measuring means can count the standing waves as a measure of the angular movement.

4. An optical gyro comprising a body having a spherical cavity therein filled with a gas laser material, nine reflecting regions on the wall of said cavity arranged in three sets of three regions each, the three regions of each set being equally spaced about a different great circle of said spherical cavity with each of said great circles being orthogonally related to the other, said body including means associated therewith for stimulating said gas laser material to emission and for producing counter-rotating light beams following three equilateral triangular optical paths defined by said three sets of reflecting regions, and means for detecting any frequency split in said counter-rotating light beams resulting from rotation of said optical gyro.

References Cited

UNITED STATES PATENTS 3,387,226  6/1968  Haisma _____ 331—94.5

OTHER REFERENCES

Macek et al., Ring Laser Rotation Rate Sensor, Optical Masers, Microwave Research Institute Symposia Series, vol. XIII, published by Polytechnic Press, Brooklyn N.Y., 1963, pp. 199–207.

Rosenthal, Regenerative Circulatory Multiple-Beam Interferometer for the study of light-propagation effects, J. O. S. A., vol. 52, No. 10, October 1962, pp. 1143–1148 Q. C. 350.06.

Tang et al, Regular Spiking and Single-Mode Operations of Ruby Laser.

JAMES J. GILL, Primary Examiner

HERBERT GOLDSTEIN, Assistant Examiner

U.S. Cl. X.R.

73—505; 331—945